(12) United States Patent
Albl et al.

(10) Patent No.: US 10,589,568 B2
(45) Date of Patent: Mar. 17, 2020

(54) WHEEL HUB ARRANGEMENT FOR A MOTOR VEHICLE

(71) Applicant: AUDI AG, Ingolstadt (DE)

(72) Inventors: Johannes Albl, Ingolstadt (DE);
Michael Frisch, Schönberg (DE);
Patrick Stanke, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 158 days.

(21) Appl. No.: 15/790,594

(22) Filed: Oct. 23, 2017

(65) Prior Publication Data
US 2018/0141375 A1 May 24, 2018

(30) Foreign Application Priority Data

Nov. 21, 2016 (DE) .................. 10 2016 222 855

(51) Int. Cl.
*B60B 27/00* (2006.01)
*B60B 27/02* (2006.01)
*F16D 3/30* (2006.01)

(52) U.S. Cl.
CPC ...... *B60B 27/0073* (2013.01); *B60B 27/0005* (2013.01); *B60B 27/0042* (2013.01); *B60B 27/02* (2013.01); *B60B 2900/5112* (2013.01); *B60B 2900/5114* (2013.01); *F16D 3/30* (2013.01)

(58) Field of Classification Search
CPC ... B60B 27/00; B60B 27/005; B60B 27/0015; B60B 27/0026; B60B 27/0073
See application file for complete search history.

(56) References Cited

U.S. PATENT DOCUMENTS

| | | | | |
|---|---|---|---|---|
| 6,135,571 A * | 10/2000 | Mizukoshi | .............. | B60B 27/00 301/105.1 |
| 6,524,012 B1 * | 2/2003 | Uchman | .................. | B60B 27/00 384/544 |
| 6,626,581 B2 * | 9/2003 | Uchman | .................. | B60B 27/00 384/544 |
| 8,256,967 B2 * | 9/2012 | Langer | ................ | B60B 27/0005 384/544 |

(Continued)

FOREIGN PATENT DOCUMENTS

| | | |
|---|---|---|
| DE | 3140373 A1 | 4/1983 |
| DE | 10245817 A1 | 5/2003 |
| DE | 102005054284 A1 | 5/2007 |

(Continued)

OTHER PUBLICATIONS

Examination Report dated Jul. 21, 2017 of corresponding German application No. 102016222855.2; 14 pgs.

*Primary Examiner* — Jason R Bellinger
(74) *Attorney, Agent, or Firm* — Maier & Maier, PLLC

(57) ABSTRACT

A wheel hub arrangement for a motor vehicle, provided with a hub which is rotatably mounted by a wheel bearing for the attachment of a wheel. A shaft, which is formed separately from the wheel hub, is non-rotatably coupled to the wheel hub. At the same time a first receiving section of a sealing receptacle is formed in the wheel hub in which is arranged a shaft, in which a sealing device is arranged which engages a second receiving section of the sealing receptacle formed in the axial direction with respect to an axis of rotation of the wheel hub, adjacent to the first receiving section.

7 Claims, 1 Drawing Sheet

(56) References Cited

U.S. PATENT DOCUMENTS 8,714,573 B2 * 5/2014 Harada ................... F16D 3/18
　　　　　　　　　　　　　　　　　　　　　384/544
2010/0226604 A1 9/2010 Nakagawa et al.

FOREIGN PATENT DOCUMENTS

| DE | 102008050127 A1 | 4/2010 |
| DE | 102014210732 A1 | 12/2015 |
| EP | 0852300 B1 | 2/2002 |
| EP | 2202092 A1 | 6/2010 |
| FR | 3019092 B1 | 4/2016 |

* cited by examiner

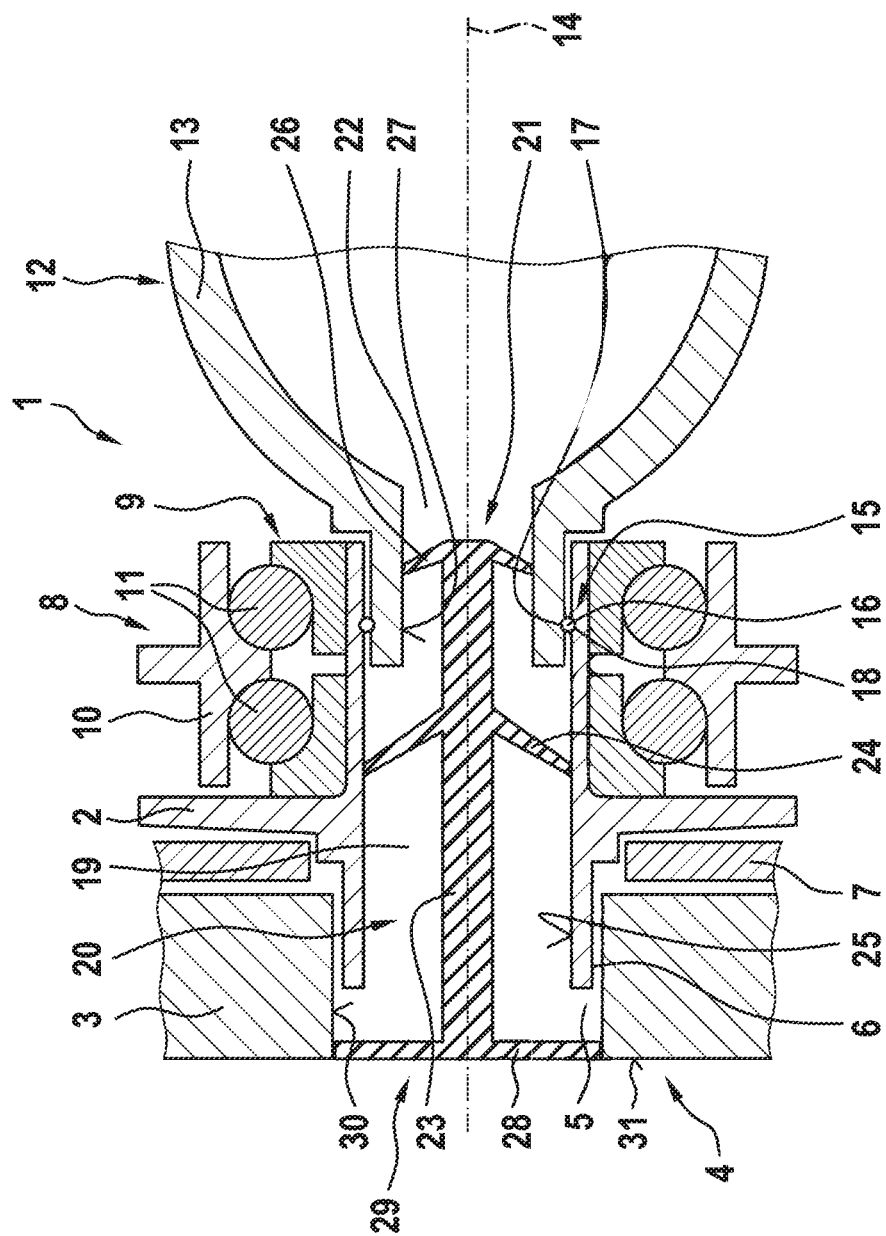

WHEEL HUB ARRANGEMENT FOR A MOTOR VEHICLE

FIELD

The invention relates to a wheel hub arrangement for a motor vehicle provided with a wheel hub rotatably mounted by means of a wheel bearing for the attachment of a wheel, wherein a shaft that is built separately from the wheel hub is coupled to the wheel hub in a rotationally fixed manner.

BACKGROUND

The wheel hub arrangement is used to support the wheel bearing, in particular the rotatable bearing of the wheel, with respect to the car body of the motor vehicle. The wheel hub arrangement is provided with the wheel hub to which can be attached the wheel or a rim of the wheel. The wheel hub is in turn rotatably supported by means of a wheel bearing, in particular on a wheel carrier, so that the wheel is as a whole rotatably mounted. The wheel is in this case connected by the wheel hub and the wheel bearing to the wheel carrier or mounted on it. The wheel carrier is again linked to the car body, for example by means of at least one steering link. The steering link can be in this case provided as a transverse link or a longitudinal link.

In addition to the wheel hub, the wheel hub arrangement is also provided with a shaft. The shaft is non-rotatably coupled to the wheel hub. The shaft is formed separately from the wheel hub and subsequently connected to it during the assembly of the wheel hub arrangement. For example, the wheel hub and consequently also the wheel of the motor vehicle can be driven via the shaft. The wheel is thus arranged as a drivable wheel of the motor vehicle or of a wheel axle, which is associated with the wheel as a drivable wheel axle.

From prior art is known for example the document DE 10 2014 210 732 A1. This document describes a bearing arrangement for a motor vehicle that can be driven by a wheel hub via a rotary joint, wherein the wheel hub is connected to a wheel flange and the rotary joint is connected to a shaft, which are non-rotatably connected to each other and provided with a double-row roller bearing mounted on the wheel hub with at least one separate bearing inner ring, which is arranged axially on the outside and which is directed towards the rotary joint and axially prestressed by a collar of the wheel hub acting on an end face of the bearing inner ring. A sealing ring consisting of a sheet metal comes into contact with the inner bearing ring, wherein the sealing ring comprises a sealing element, which comes into sealing contact with the rotary joint in order to provide protection for the region between the inner bearing ring, the collar and the swivel joint, in particular from moisture and dirt. The sealing element is provided with a sealing lip that is equipped with a plurality of recesses, wherein the recesses are uniformly distributed on the sealing lip along the circumferential direction and separated from each other by bars in order to achieve a reduced friction between the sealing lip and the rotary joint when the sealing link is pushed on the rotary joint.

Furthermore, document DE 31 40 373 A1 describes a wheel bearing unit for driven wheels of motor vehicles, which consists of an inner ring with an axially continuous bore, as well as an outer ring fastened to the chassis and roller bodies rotating therebetween. The inner ring is provided on its output side with a directly adjacent, radially outwardly extending fastening flange. Means for centering these parts engage on the outer side surface of the fastening flange in the bore of a wheel rim or brake disc.

In order to enable inexpensive manufacturing of a robust and precisely centric attachment of the wheel rim and/or brake to the inner ring, and at the same time also provide a shockproof seal of the driving rotary joint in the bore of the inner ring being driven toward the output side, the means for centering the wheel rim or brake disk are formed by a centering ring that has a fastening section, which is tightly fixed in its bore surface in the bore of the inner ring, as well as a wall section that fully closes the bore.

Furthermore, the document FR 3 029 092 B1 is also known from prior art.

SUMMARY

The object of the invention is to provide a wheel hub arrangement for a motor vehicle which has advantages over known wheel hub arrangements, in particular because it has a lighter weight and/or is easier to mount.

This is achieved according to the invention with a wheel hub arrangement which has the features of the present disclosure. At the same time, it is provided that a first receiving section of a sealing receptacle is built in the wheel hub, in which is arranged a sealing device which engages in a second receiving section of the sealing receptacle formed in the shaft, and adjoins the first reception receptacle section in the axial direction with respect to the axis of rotation of the wheel hub.

The wheel hub arrangement is therefore provided with the sealing receptacle, which is equipped with its first receiving section in the wheel hub, and with its second receiving section in the shaft. Both receiving sections of the sealing receptacle, which is to say the first receiving section and the second receiving section, adjoin each other in the axial direction with respect to the axis of rotation of the wheel hub. In particular, the first receiving section transits directly into the second receiving section.

The second receiving section is in this respect preferably located in a shaft pin, which engages in the wheel hub. In order to form the second receiving section, the shaft pin is designed to be hollow, at least in sections, preferably continuously in the axial direction.

In other words, the first receiving section of the sealing receptacle is delimited in the circumferential direction by an inner peripheral surface of the wheel hub, and the second receiving section is delimited by an inner circumferential surface of the shaft, in particular by an inner circumferential surface of the shaft pin. Both the wheel hub and the shaft are respectively provided with a corresponding recess, which forms the first receiving section or the second receiving section of the sealing receptacle.

The sealing device serves to seal the first receiving section and/or the second receiving section against the external environment of the of the wheel hub arrangement. For this purpose, the sealing device is arranged at least partially on an inner circumferential surface of the sealing device, in particular in the circumferential direction with respect to the axis of rotation. The sealing device preferably consists of an elastic material, for example a plastic material, in particular an elastomer. It goes without saying that it can be also made of a metal, at least partially.

For example, it can be provided that the sealing device comprises a reinforcing core, which is made of a more rigid material that is surrounded by a sealing sleeve that is made of a softer material.

It is preferred when the sealing device is held in the sealing receptacle in a force-locking manner. To this extent, it is inserted or pressed into the sealing receptacle. Although the sealing device is arranged on the wheel hub and/or on the shaft, it preferably does not cause any retaining effect between them. If the sealing device is arranged both at the wheel hub and at the shaft, at the most a small retaining effect can occur as a result of the force-fitting fastening of the sealing device in the sealing receptacle.

The sealing device consists for example of a central body, from which at least one sealing projection extends in the radial direction, which is to say radially outwards. This radial projection is arranged for example on the wheel hub or on the shaft. The central body itself is provided with dimensions in the radial direction which are smaller than the dimension of the first receiving section and/or of the second receiving section of the sealing receptacle. Preferably, the dimensions of the central body are at the most 0.75, at the most 0.5, or at the most 0.25 of the dimensions in the radial direction. By means of such a configuration, the amount of the material that is required for the sealing device is significantly reduced, so that a drastic reduction of the weight of the wheel hub arrangement is achieved regardless of the material of the sealing device.

In another embodiment of the invention it is provided that the shaft is equipped on its side facing the wheel hub with a joint well pin engaged in the wheel hub, in particular a joint hub of a synchronous joint or of a cardan joint. The shaft is coupled by means of the joint hub to another shaft, wherein the other shaft can be provided with an axis of rotation that is different from the axis of rotation of the shaft, in particular because it is angled. The shaft in this respect forms a component of a joint shaft, for example of a synchronous shaft, or a cardan shaft. Accordingly, the joint hub component is connected with the shaft pin that was already mentioned above, which can be in this respect also referred to as joint shaft pin. The connection between the joint hub and the shaft pint is preferably a rigid connection. In particular, the joint hub and the shaft pin are designed in one piece and/or as the same unit from the viewpoint of the material.

In a preferred embodiment it is provided that the shaft, in particular the shaft pin, is equipped with a gear having teeth that are designed for non-rotatable meshing with counter-toothing of the wheel hub. In this case it can be provided that the shaft or the shaft pin engages in the wheel hub. In this case, the gearing of the shaft is designed as an outer toothing gear, which meshes with the inner toothing of the counter-toothing of the wheel hub. Alternatively, it is also possible that the shaft surrounds the wheel hub. At the same time, the toothing of the shaft is formed as inner toothing, which meshes with the counter-toothing, which is then provided as outer toothing. It is of course also possible that the shaft and the wheel hub are provided with an external toothing or end-face toothing, wherein the outer toothing cooperates to create a non-rotatable coupling of the shaft and of the wheel hub.

According to another development of the invention it is provided that the first receiving section extends completely through the wheel hub in the axial direction. The first receiving section is thus formed open on both sides in the wheel hub in the axial direction, or in the longitudinal section. In this case, it is provided with an opening that is facing away from the shaft and with an opening facing the shaft, wherein the shaft for example engages into the wheel hub through the opening. A significant reduction of the weight can be achieved when the wheel hub passes completely through the first receiving section.

Within the scope of the present embodiment of the invention, it is provided that the sealing device is in a tight sealing contact with the inner peripheral surface of the wheel hub, in particular with a first sealing projection. The inner peripheral surface of the wheel hub delimits the first receiving section of the seal receptacle in the radial direction. In order to seal the seal receptacle, the sealing device engages continuously the sealing inner circumferential surface, in particular in the circumferential direction. For this purpose, the sealing device is provided with a first sealing projection, which can be designed for example in the form of a radial sealing lip. The first sealing projection preferably extends from the basic body of the sealing device, already described above. The outer dimensions of the first sealing projection in the radial direction correspond for example to at least 1.5 times of the dimensions of the basic body in the same direction, preferably to at least 2.0 times, at least 2.5 times, at least 2.75 times, or at least 3.0 times of the dimensions of the basic body.

According to a further preferred embodiment of the invention it can be provided that the sealing device is sealingly applied to an internal circumferential surface of the shaft, in particular with a second sealing projection. The close contact of the inner circumferential surface of the wheel hub can be additionally or alternately applied also to the close contact with the inner circumferential surface of the wheel hub. For example, the sealing device can be for this purpose provided with the second sealing projection, which can be essentially designed analogously to the first sealing projection. Reference is therefore made to corresponding embodiments. However, the outer dimensions of the second sealing projects in the radial direction are preferably smaller than the outer dimensions of the first sealing projection. Relative to the outer dimensions of the second sealing projection, the outer dimension of the first sealing projection in the same direction correspond for example to at least 1.25 times, at least 1.5 times, at least 1.75 times or at least 2.0 times of these dimensions.

Within the scope of another embodiment of the invention it can be provided that the joint shaft pin is designed as a hollow pin and the inner circumferential surface is present in the joint shaft pin. The weight of the wheel hub arrangement can be again further reduced by using the hollow pin. However, since the lubrication space of the synchronous joint or cardan joint is limited in other embodiments of the wheel hub arrangement in the direction of the wheel hub by the massive design of the joint shaft pin, this makes it necessary to realize a sealing that limits the lubrication space. This sealing is provided with the illustrated sealing device, which for this purpose rests against the inner circumferential surface. The inner circumferential surface is for this purpose associated with the joint shaft pin, which is to say that it is present in it.

According to a preferred embodiment of the invention it is provided that the sealing device projects on its side facing away from the shaft beyond the wheel hub and is provided therein with a radial projection for the formation of a rim cap which protrudes in the radial direction of the first receiving section. The sealing device thus passes in this respect through the sealing receptacle, from the shaft or from the second receiving section up to its side facing away from the shaft and it protrudes there beyond the wheel hub. At its end facing away from the shaft, the sealing device is provided with the radial projection, which forms the rim cap. The rim cap thus forms in this respect an integral structural component of the sealing device and it is therefore not provided as a component that needs to be mounted separately.

The rim cap is for example dimensionally formed for and/or dimensionally adapted to a wheel hub receptacle. This means that the rim cap is fully engaged by it, or as an alternative is resting against its inner circumferential surface, in particular continuously in the circumferential direction. In the latter case, the rim cap is provided, for example in the radial direction, with measurements which correspond to the measurement of the wheel rim seat of the of the wheel hub. The wheel rim seat of the wheel hub is used for the arrangement of the wheel rim on the wheel hub. For example, the wheel hub is engaged with its wheel hub seat in the wheel hub receptacle of the wheel rim, in particular in such a way that the outer circumference of the wheel rim seat of the wheel hub is deployed directly in the circumferential direction next to the inner circumferential surface of the wheel hub receptacle of the wheel rim. Accordingly, the rim cap protrudes in the radial direction into the first receiving section as it is provided with larger dimensions.

According to a further preferred embodiment of the invention, the shaft is fixed in the axial direction to the wheel hub via a fixing means, which is different from the sealing device. It was already pointed out above that the sealing device exerts no retaining effect on the wheel hub with respect to the shaft or vice versa. Accordingly, a fixing means is provided for axial fixing of the shaft relative to the wheel hub, which is different from the sealing device.

The fixing means is provided for example in the form of a snap ring, which on the one hand engages in a recess penetrating an outer peripheral surface of the shaft, and on the other hand engages in the recess formed in the inner circumference surface of the wheel hub, or of the receiving section. The fixing means replaces in this respect a central screw by means of which the wheel hub and the shaft are mutually fixed to each other, which would otherwise be required.

Finally, it can be provided within the scope of a further embodiment of the invention that the second receiving section fully engages the shaft in the axial direction. The second receiving section thus adjoins, seen in the axial direction or in the longitudinal direction, on the one hand the first receiving section, or opens into it. On the other hand, it engages the shaft in the direction facing away from the wheel hub. For example, it opens into or passes through the shaft pin. The second receiving section can in this respect serve at least partially to receive a lubricant for the joint. In particular, a lubrication space of the joint, in particular a synchronous joint or a cardan joint, is provided in the second receiving section. It is preferred in this case when the lubrication space is formed at least partially in the shaft pin.

BRIEF DESCRIPTION OF THE DRAWING

The invention will be explained next in more detail with reference to the embodiment illustrated in FIG. 1, without limiting the invention in this manner, wherein the single FIGURE shows the following:

FIG. 1 may show a schematic longitudinal sectional view of a wheel hub arrangement for a motor vehicle.

DETAILED DESCRIPTION OF THE DRAWING

FIG. 1 shows a schematic longitudinal sectional view of a wheel hub arrangement 1 for a motor vehicle. The wheel hub arrangement 1 is provided with a wheel hub 2, to which can be attached a wheel disk 3 of a wheel 4 of the motor vehicle. For example, the wheel disk 3 is provided with a wheel hub receptacle 5, while the wheel hub 2 is provided with a wheel rim seat 6. After the wheel 4 has been mounted on the wheel hub 2, the wheel hub 2 is engaged with its wheel rim seat 6 in the wheel hub receptacle 5 of the wheel disk 3. In addition, a brake disc 7 can be arranged on the wheel hub 2, by means of which the wheel 4 can be braked. The wheel hub 2 is rotatably mounted by means of a wheel bearing 8, namely with respect to a wheel carrier, not shown. The wheel bearing 8 is in the embodiment shown here designed as a multi-row roller bearing, in particular as a two-row roller bearing. Accordingly, it is provided with roller elements 11 arranged between an inner ring 9 and an outer ring 10.

Similarly, a component of the wheel hub arrangement 1 is a shaft 12, which is provided as a component of a joint shaft. Accordingly, the shaft 12 is provided with a joint hub 13, which is in particular located on the side of the shaft 12 facing away from the wheel hub 2. The joint hub 13 is for example a component of a synchronous joint or a cardan joint. The shaft 12 is formed separately from the wheel hub 2 and it is non-rotatably coupled to it. In the embodiment shown here, the shaft 12 engages in the wheel hub 2, in particular with a shaft pin or with a joint shaft pin.

In order to realize rotationally fixed coupling of the shaft 12 with respect to the wheel hub 2, an outer toothing of the shaft 12 (not shown here) meshes with an inner toothing (not shown here) of the wheel hub 2. The outer toothing is provided for example on the shaft pin. A fixing means 15 is provided in order to additionally fix the shaft in the axial direction with respect to the rotational axis 14 of the wheel hub. The means is here provided in the form of a snap spring 16, which engages on one side in a receptacle 17 of the shaft 12, and on the other side in a receptacle 18 of the wheel hub 2. The receptacle 17 in this case thus engages an outer circumferential surface of the shaft 12, while the receptacle 18 engages an inner circumferential surface of the wheel hub 2.

In the wheel hub 2 is formed a first receiving section 19 of a sealing receptacle 20. In this receiving section 19 is arranged a sealing device 21, which extends to the second receiving section 22 of the sealing receptacle 20 adjacent to the first receiving section 19. The second receiving section 22 of the sealing receptacle 20 is formed in the shaft 12, or more specifically at least partially in the shaft pin. Preferably, the first receiving section 19 engages the wheel hub 2, and/or the second receiving section 22 fully engages the shaft 12 or the shaft pin in the axial direction.

The sealing device 21 is provided with a basic body 23, which has a cross-section that can be for example round, seen in the direction of the rotational axis 14. A first sealing projection 24 extends from the basic body 23, which is provided for example in the form a sealing lip. The first sealing projection abuts an internal circumferential surface 25 of the wheel hub 2, which the first receiving section 19 of the sealing receptacle 20 delimits in the radial direction. For example, the sealing projection 24 is angled with respect to the rotational axis 14 seen in the longitudinal cross-section, in particular in such a way that it is inclined in the radially outward direction away from the shaft 12.

In addition or as an alternative, a second sealing projection 26 is provided, which also extends outwardly in the radial direction from the basic body 23. The second sealing projection 26 rests against a circumferential surface 27 of the shaft 12, whereby the inner circumferential surface 27 is preferably present in the shaft pin. Analogously to the first sealing projection 24, the second sealing projection can be inclined with respect to the rotational axis 14, in particular in the direction away from the shaft 12, or in the direction toward the wheel disk 3. Both the first sealing projection 24 and the second sealing projection 26 are sealingly arranged on the respective inner circumferential surface 25 or 27, in particular in the circumferential direction. The first sealing projection 24 is in addition arranged at a distance from the shaft 12 in the axial direction, or it is arranged at a distance from the shaft 12 in the axial direction on the inner circumferential surface 25 of the wheel hub 2.

The sealing device 21 is provided on its side facing away from the shaft 12 with a radial projection 28, which forms a hub cap 29. The radial projection 28 is preferably provided with a round cross-section. It can be designed in such a manner that it sealingly rests against an inner circumferential surface 30 of the wheel hub receptacle 5 of the wheel disk 3, in particular continuously in the circumferential direction. However, it can also project beyond the wheel disk 3 in the direction facing away from the shaft 12 and it can be sealing arranged on a front side surface 31 of the wheel disk 3. The first sealing projection 24 is additionally arranged at a distance from the shaft 12 seen in the axial direction on the inner circumferential surface 25 of the wheel hub 2.

The sealing device 21 is on its side facing away from the shaft 12 provided with a radial projection 28 which forms a cap 29. The radial projection 28 is preferably round seen in profile. It can be designed in such a way that it abuts an inner circumferential surface 30 of the wheel hub receptacle 6 of the wheel disk 3, in particular continuously in the circumferential direction. However, it can also protrude beyond the wheel rim 3 in the direction facing away from the shaft 12 so that it sealingly rest against a front side face 31 of the wheel disk 3. In any case, the hub cap 29 closes the wheel hub receptacle 5 in the direction away from the wheel hub 2.

Accordingly, it has larger dimensions in the radial direction than the first receiving section 19 of the sealing receptacle 20, or it has at least the same size.

The wheel hub arrangement 1 described here has the advantage that it provides extreme weight savings, while in addition to that, it is also very easy to install. Since the shaft 12 is fixed with respect to the wheel hub 2 in the axial direction by means of the fixing means 15, the sealing device 21 can be arranged in the sealing receptacle 20. The sealing device 21 in this case preferably consists of a sealing material, or at least a material that has a smaller sealing characteristics than the material of the wheel hub 2 and/or the material of the shaft 12. For this reason and also due to the smaller dimensions of the sealing device 21 in the radial direction, in particular of the basic body 23, a very low weight is achieved. In addition, the shaft pin of the shaft 12 is hollow, at least in some sections, preferably continuously, and it is therefore provided as a hollow pin.

The invention claimed is:

1. A wheel hub arrangement for a motor vehicle, comprising: a wheel hub, which is rotatably mounted by a wheel bearing, for the attachment of a wheel, wherein a shaft, formed separately from the wheel hub, is non-rotatably coupled to the wheel hub, wherein a first receiving section of a sealing receptacle is formed in the wheel hub, in which is arranged a sealing device, the sealing device engaging a second receiving section of the sealing receptacle, the second receiving section formed in the shaft, adjacent to the first receiving section of the sealing receptacle and adjoining the first receiving section in the axial direction with respect to the rotational axis of the wheel hub wherein the sealing device is sealingly arranged on an inner circumferential surface of the wheel hub and on an inner circumferential surface of the shaft.

2. The wheel hub arrangement according to claim 1, wherein the shaft is provided, on a side facing the wheel hub, with a shaft pin engaged in the wheel hub, the shaft pin connected to a joint hub of a synchronous joint or a cardan joint.

3. The wheel hub arrangement according to claim 1, wherein the first receiving section completely engages the wheel hub in the axial direction.

4. The wheel hub arrangement according to claim 2, wherein the shaft pin is designed as a hollow pin and an inner circumferential surface is present in the shaft pin.

5. The wheel hub arrangement according to claim 1, wherein the sealing device projects beyond the wheel hub on a side facing away from the shaft and is provided therein with radial projections for the formation of a hub cap, which projects in a radial direction over the first receiving section.

6. The wheel hub arrangement according to claim 1, wherein the shaft is fixed in the axial direction by a fixing means with respect to the wheel hub, which is different from the sealing device.

7. The wheel hub arrangement according to claim 1, wherein the second receiving section completely engages the shaft in the axial direction.

* * * * *